(12) United States Patent
Negri et al.

(10) Patent No.: US 11,783,293 B1
(45) Date of Patent: *Oct. 10, 2023

(54) TEMPLATES FOR CONTENT SPACES IN A CONTENT MANAGEMENT SYSTEM

(71) Applicant: Contentful GmbH, Berlin (DE)

(72) Inventors: Paolo Negri, Berlin (DE); Andrew Grant, Berlin (DE); Farruco Sanjurjo, Berlin (DE); Thomas Spiesser, Berlin (DE); Grace Gross, Berlin (DE)

(73) Assignee: Contentful GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,178

(22) Filed: May 11, 2022

(51) Int. Cl.
*G06F 9/44* (2018.01)
*G06F 9/445* (2018.01)
*G06Q 10/101* (2023.01)
*G06Q 10/10* (2023.01)
*G06F 8/61* (2018.01)

(52) U.S. Cl.
CPC ............ *G06Q 10/101* (2013.01); *G06F 8/61* (2013.01); *G06Q 10/103* (2013.01)

(58) Field of Classification Search
CPC ....... G06Q 10/101; G06Q 10/103; G06F 8/61
See application file for complete search history.

(56) References Cited

U.S. PATENT DOCUMENTS 10,942,944 B2 * 3/2021 Busch ................. G06F 16/27
11,170,345 B2 * 11/2021 Pai ..................... G06Q 10/101
11,397,970 B2 * 7/2022 Peleg ................. G06Q 30/0244
2009/0265243 A1 * 10/2009 Karassner .......... G06Q 30/0275
                                                    705/14.54
2014/0201686 A1 * 7/2014 Bakthavachalam ...... G06F 8/30
                                                    715/854
2015/0156226 A1 * 6/2015 Hollis ................. G06F 3/0482
                                                    715/753

(Continued)

FOREIGN PATENT DOCUMENTS

CN          109471620 A  *  3/2019
KR     20190114932 A  *  10/2019

(Continued)

OTHER PUBLICATIONS

Shailesh Kumar Shivakumar, Development Using Templates and Workflows, 2017, pp. 1-41. https://ieeexplore.ieee.org/xpl/ebooks/bookPdfWithBanner.jsp?fileName=7827523.pdf&bkn=7753055&pdfType=chapter (Year: 2017).*

(Continued)

*Primary Examiner* — Mongbao Nguyen
(74) *Attorney, Agent, or Firm* — Penilla IP, APC

(57) ABSTRACT

In a content management system (CMS), a method for managing content types across multiple content spaces is provided, including: receiving, through a template creation interface, a selection of content types of a source content space; generating a template having said selection of content types, and storing said template to a template library; receiving a command to install the template into a destination content space; responsive to said command, installing the content types of the template into the destination content space, and establishing a link between the destination content space and the template such that the installed content types are identified as being managed via the template.

15 Claims, 17 Drawing Sheets

(56) References Cited

U.S. PATENT DOCUMENTS

| | | | |
|---|---|---|---|
| 2015/0248423 A1* | 9/2015 | Christolini | G06F 40/186 |
| | | | 715/202 |
| 2018/0189733 A1* | 7/2018 | Newhouse | G06F 16/9558 |
| 2019/0102570 A1* | 4/2019 | Broussard | G06F 21/6218 |
| 2019/0347362 A1* | 11/2019 | Beier | G06F 16/951 |
| 2020/0097719 A1* | 3/2020 | Lodhia | G06F 40/186 |
| 2021/0150489 A1* | 5/2021 | Haramati | G06Q 10/0633 |
| 2021/0157978 A1* | 5/2021 | Haramati | G06Q 10/1097 |
| 2022/0036311 A1* | 2/2022 | Didrickson | G06F 16/93 |
| 2022/0059087 A1* | 2/2022 | Miller | H04L 67/02 |
| 2022/0156456 A1* | 5/2022 | Gadiya | G06V 30/418 |

FOREIGN PATENT DOCUMENTS

| | | | | |
|---|---|---|---|---|
| WO | WO-2019096086 A1 * | 5/2019 | | H04L 29/06 |
| WO | WO-2021047238 A1 * | 3/2021 | | G06F 16/958 |

OTHER PUBLICATIONS

Shailesh Kumar Shivakumar, Content Management System Architecture, 2016, pp. 104-153. https://ieeexplore.ieee.org/document/7827504?arnumber=7827504&source=IQplus (Year: 2016).*

Shailes Kumar Shivakumar, Basics of Content Management Systems, 2017, pp. 82-103. https://ieeexplore.ieee.org/xpl/ebooks/bookPdfWithBanner.jsp?fileName=7827515.pdf&bkn=7753055&pdfType=chapter (Year: 2017).*

Maciej Nakwaski, Content Management System for Web Portal, 2010, pp. 233-235. https://ieeexplore.ieee.org/stamp/stamp.jsp?tp=&arnumber=5446091 (Year: 2010).*

John S. Erickson, Content-Centered Collaboration Spaces, 2009, pp. 1-9. https://ieeexplore.ieee.org/stamp/stamp.jsp?tp=&arnumber=5226614 (Year: 2009).*

* cited by examiner

Fig. 6D

Content Model

FILTER BY STATUS
- All
- Changed
- Draft
- Active

| Name | Fields | Updated | By | Status |
|---|---|---|---|---|
| Content type is managed through a template | | | | |
| Component: Hero | 6 | Jul 13, 2021 | Me | ACTIVE |
| Component: Image | 3 | Aug 17, 2021 | Me | ACTIVE |
| Component: Section | 2 | Jul 13, 2021 | Me | ACTIVE |
| Component: Text | 2 | Aug 17, 2021 | Me | ACTIVE |
| Component: Video | 2 | Jul 13, 2021 | Me | ACTIVE |
| Compose: Page | 5 | Aug 11, 2021 | Me | ACTIVE |
| Compose: SEO | 6 | Jul 13, 2021 | Me | ACTIVE |
| Grace Gross | 1 | Aug 11, 2021 | Me | ACTIVE |
| Help Center Article | 3 | Jul 13, 2021 | Me | ACTIVE |
| Landing Page | 3 | Jul 13, 2021 | Me | ACTIVE |

Fig. 8A

Content model / Contentful Apps

Space home | Content model | Content | Media | Apps ▾ | Settings ▾ | TRIAL | 🔍 | ? | 👤

Component: Hero — 810

⚠️ This content type is managed through a template. We recommend you do not edit the fields, as this may impact your ability to install new versions of the template. — 812

Fields (6) ★ Groups NEW    JSON preview    Sidebar    Entry editors

[Ab] Internal Name Short text    Entry title

[Ab] Title Short text

[≡] Text Rich text

[△] Image Media

[Ab] CTA Text Short text

[🔗] CTA LinK Reference

---

FIELDS

The content type has used 6 out of 50 fields.

ENTRY EDITOR APPEARANCE

Change the entry editor's appearance for this Content type in the Entry editor settings

CONTENT TYPE ID

Use this ID to retrieve everything related to this content type via the API.

`component_hero`

DOCUMENTATION

Read more about content types in our guide to content modelling.

To learn more about the various ways of disabling and deleting fields have a look at the field lifecycle.

Fig. 8B

Component: Hero Template source ← 820

● To include an updated content type in the template, re-add it to template 822 | Got it |

Fields (6)   ★ Groups [NEW]   JSON preview   Sidebar   Entry editors

| Ab | Internal Name   Short text

Entry title

| Ab | Title   Short text

| ≡ | Text   Rich text

| △ | Image   Media

| Ab | CTA Text   Short text

| 🔗 | CTA Link   Reference

FIELDS

The content type has used 6 out of 50 fields.

ENTRY EDITOR APPEARANCE

Change the entry editor's appearance for this Content type in the Entry editor settings

CONTENT TYPE ID

Use this ID to retrieve everything related to this content type via the API.

component_hero

DOCUMENTATION

Read more about content types in our guide to content modelling.

To learn more about the various ways of disabling and deleting fields have a look at the field lifecycle.

Fig. 8C

TEMPLATES FOR CONTENT SPACES IN A CONTENT MANAGEMENT SYSTEM

FIELD OF THE DISCLOSURE

The present disclosure relates to methods and systems for providing templates for feature synchronization in a content management system.

BACKGROUND

Description of the Related Art

A content management system (CMS) is useful for enabling organizations to create and edit digital content in a structured manner. A given organization's content can be broken down into modular, reusable components, enabling deployment of content in a variety of combinations to suit different presentation contexts. Further, the appearance of content can be adjusted to suit the presentation context at the time it is retrieved and presented to the consuming end user.

In the implementation of a CMS, content is developed in a structured manner that provides great flexibility in terms of content management, re-use and deployment.

It is in this context that implementations of the disclosure arise.

SUMMARY

Implementations of the present disclosure include methods and systems relating to templates for feature synchronization in a content management system (CMS).

In a CMS, many organizations have multiple content spaces for enabling separate management of content for various markets, products, etc. However, they often reuse the same content types across spaces. To address this issue, organization level templates are implemented for easing installation and enabling synchronization of content types and other features across multiple spaces. A template can be created using the content types of one or more source spaces or directly via API. Prior to installation, a validation process can be performed to check whether a given template will create conflicts with an existing space environment. Once a template is installed in a given space environment, then the content types installed through the template are indicated as being managed via the template. Multiple templates can be installed into target spaces to build out the fuller space set-up. Templates are versioned, and different space environments may use different versions of the same template. Templates may further be configured to govern other features of spaces, such as webhooks, roles/permissions, apps, etc.

In some implementations, in a content management system (CMS), a method for managing content types across multiple content spaces is provided, including: receiving, through a template creation interface, a selection of content types of a source content space; generating a template having said selection of content types, and storing said template to a template library; receiving a command to install the template into a destination content space; responsive to said command, installing the content types of the template into the destination content space, and establishing a link between the destination content space and the template such that the installed content types are identified as being managed via the template.

In some implementations, the method further includes: providing an editor interface of the CMS that enables customized access to edit content of the destination content space.

In some implementations, the editor interface is configured to display the installed content types, wherein said display includes a visual indicator that identifies the installed content types as being managed via the template.

In some implementations, the method further includes: receiving, through the editor interface of the CMS, a command to create a content entry based on one of the installed content types; responsive to the command to create the content entry, then generating and storing the content entry in the destination content space, said content entry having one or more fields as defined by the one of the installed content types.

In some implementations, the method further includes: further receiving through the editor interface of the CMS, input data for storage into one or more fields of the content entry.

In some implementations, installing the content types of the template includes performing a validation process to verify compatibility of the template with the destination content space.

In some implementations, verifying compatibility includes verifying that no existing content types of the destination content space have the same name as any of the content types of the template.

In some implementations, verifying compatibility includes verifying that installing the content types of the template into the destination content space would not exceed a number of content types allowed in the destination content space.

In some implementations, verifying compatibility of the template includes verifying compatibility of a change to a type of a field of a given content type.

In some implementations, verifying compatibility of the template includes verifying that a field, of a given content type, to be deleted by the installation of the template, is not utilized in the destination content space.

In some implementations, the method further includes: receiving a command to install a second template into the destination content space; responsive to said command to install the second template, installing content types of the second template into the destination content space, and establishing a link between the destination content space and the second template such that the installed content types of the second template are identified as being managed via the second template.

In some implementations, installing the template is configured to upgrade the content space from a first version of the template to a second version of the template.

In some implementations, the method further includes: receiving a command to install the template into a second destination content space; responsive to said command, installing the content types of the template into the second destination content space, and establishing a link between the second destination content space and the template such that the installed content types of the second destination content space are identified as being managed via the template.

In some implementations, the source content space, the template library, and the destination content space are part of a common domain defined for a customer of the CMS.

In some implementations, the installed content types enable content entries to be defined from the content types within the destination content space, the content entries being configured to have fields for entry of content data, said fields being defined in accordance with the content types from which said content entries are defined.

In some implementations, the template further defines one or more of webhooks, roles, or apps; and, further responsive to the command to install the template into the destination content space, then installing the webhooks, roles, or apps of the template into the destination content space.

In some implementations, in a content management system (CMS), a method for managing content types across multiple content spaces is provided, including: receiving, through a template creation interface, a selection of content types of a source content space; generating a template having said selection of content types, and storing said template to a template library; receiving a command to install the template into a destination content space; responsive to said command, performing a validation process to verify compatibility of the template with the destination content space; responsive to successful verification of the compatibility of the template with the destination content space, then installing the content types of the template into the destination content space, and establishing a link between the destination content space and the template such that the installed content types are identified as being managed via the template.

In some implementations, verifying compatibility includes verifying that no existing content types of the destination content space have the same name as any of the content types of the template.

In some implementations, verifying compatibility includes verifying that installing the content types of the template into the destination content space would not exceed a number of content types allowed in the destination content space.

In some implementations, the installed content types enable content entries to be defined from the content types within the destination content space, the content entries being configured to have fields for entry of content data, said fields being defined in accordance with the content types from which said content entries are defined.

In some implementations, verifying compatibility includes verifying that installation of the template would not delete an existing content type for which there are existing content entries of the existing content type in the destination content space.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 6D illustrates the template editing interface following addition of content types to the template, in accordance with the implementation of FIG. 6C.

FIG. 8A illustrates an interface for accessing a content model, in accordance with implementations of the disclosure.

FIG. 8B illustrates an interface for editing a content type in the CMS, in accordance with the implementation of FIG. 8A.

DETAILED DESCRIPTION

The following implementations of the present disclosure provide methods and systems relating to templates for feature synchronization in a content management system. It will be obvious, however, to one skilled in the art, that the present disclosure may be practiced without some or all of the specific details presently described. In other instances, well known process operations have not been described in detail in order not to unnecessarily obscure the present disclosure.

Customers of a CMS may use multi-space architectures for various reasons. Multi-space architectures can be used to separate the content of different teams, business units, projects, and they can also be used for advanced country/market localization. For customers of a CMS employing multi-space architectures it is often the case that content models or content types are duplicated across spaces.

Thus, in accordance with implementations of the disclosure, templates are introduced to synchronize the content models and editor interfaces across spaces in a multi-space architecture. This enables customers to define their content models once and re-use them across their spaces, and also conveniently keep the content model of their spaces up-to-date and in sync.

In some implementations, a template is a domain entity that encapsulates the desired content types and editor interfaces to be distributed across environments. A template contains the predefined blueprint state of the content models which a user may then install into any environment. The templates are stored and managed at an organizational level within the CMS.

In some implementations, supporting multi-space templates relies on a set of organization-level API endpoints and a designated domain type (e.g. domain type "EnvironmentTemplate"). The designated domain type models the resources that contain the entities that will be created or updated on the target environment.

In some implementations, template documents live at an organizational level above the multiple spaces of the organization in a templates repository. In some implementations, templates are also versioned. The creation of a template spawns a version and every update to a template creates a new version. All versions are available to use in a target environment to allow gradual rollouts of a template (e.g. a first environment can be on version 3 of a template while a second environment is on version 1 of the same template).

Figure 1:
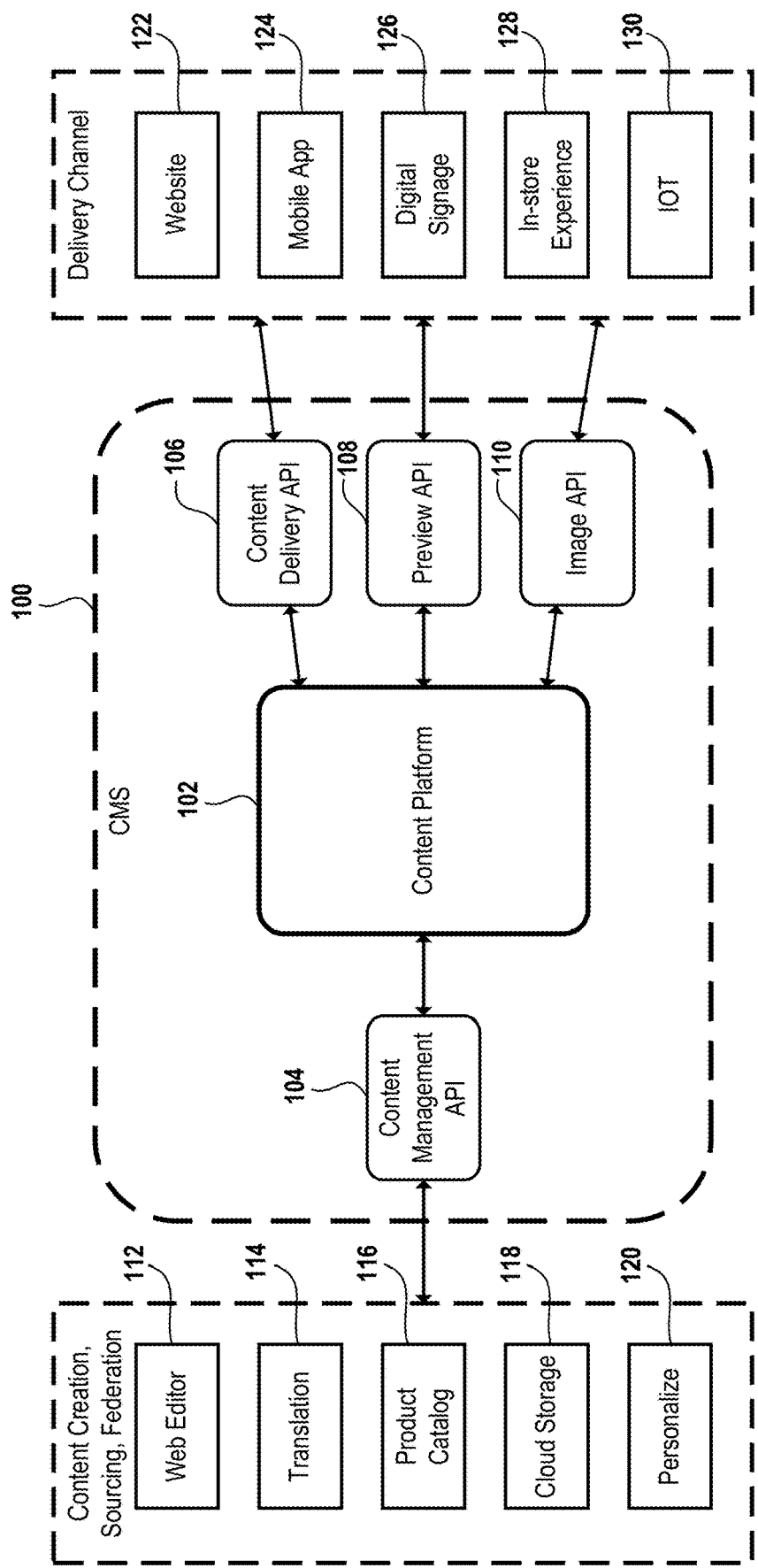
FIG. 1 conceptually illustrates a content management system (CMS) 100, and entities that interact with the CMS 100, in accordance with implementations of the disclosure.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g., JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g., an e-commerce shop), building custom editing experiences, creating/updating tags and associating content items with tags, etc.

For example, a web editor 112 is implemented to provide a web-based user interface for creating and editing content, the web editor accessing the content management API to generate new content items in the system, retrieve and edit existing content items, store changes to content items, etc. While a web editor is referenced herein, it will be appreciated that other applications can be configured to implement at least some of the functionality described in relation to the web editor, including customer-built applications, apps that integrate with the web editor, other web apps, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise affect content management actions so as to integrate with the CMS 100 via the content management API 104. In some implementations, a cloud storage system 118 can similarly integrate with the CMS 100 via the content management API 104.

In some implementations, a personalization system 120 is enabled to affect content personalization via the content management API 104. Personalization information can be utilized to enable customization of content or downstream customization of content delivery. Examples of personalization information can include user demographic information (e.g., age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g., website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g., preview deployment of a website or a preview build of a mobile app, that allows content managers and authors to view their work in-context, as if it were published, using a preview access token as though it were delivered by the content delivery API 106.

In some implementations, images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (JOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g., HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geo-location. In some implementations, user interface (UI) extensions are supported, to enable building of customized editing experiences for the web editor. In some implementations, app installations are supported, extending and expanding the capabilities of the CMS web application.

Figure 2:
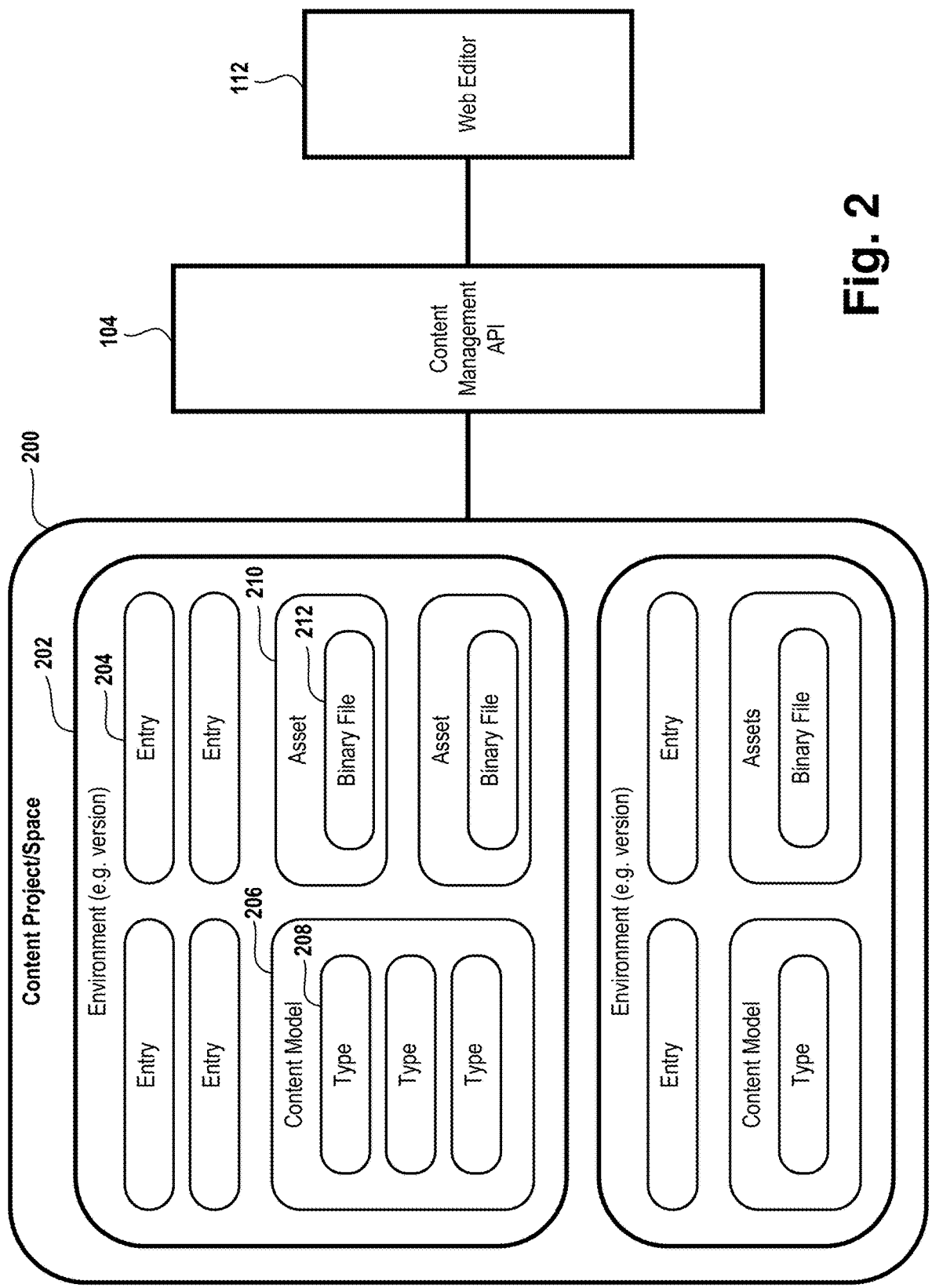
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, which groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g., system properties, name of the content type, description of the content type, listing of fields, ID of main field used for display, etc.). Each content type is flexibly configurable, further consisting of user-defined fields, which in some implementations, correspond to a JSON type (e.g., string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g., entry 204), which represent textual or structural information based on the content type used. Items can also be assets (e.g., asset 210), which can include binary files (e.g., binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but is being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g., only allow Menu Items for fields.menuItems). Asset links can be validated by file type. (e.g., only allow Images for fields.photo). Links on the Content Delivery API are resolved using the published entries and assets, while links on the Content Preview API will resolve using the draft entries and assets.

Customers of a content management system can have multiple content spaces. However, in order to replicate their content models across spaces in a multi-space architecture, they have to do it manually or write and maintain their own tooling/scripts when setting up a new space or when their content model changes. Therefore, to lower the barrier for customers to add more spaces into their organization, a new entity type, called templates, is introduced to enable sharing of data across spaces. Management and orchestration of templates can be integrated into existing CMS interfaces, removing friction in their expansion. With templates, customers are enabled to create packages of workable content types for sharing. As such, templates can also be combined into larger content models. This modular approach caters to customers that require stringent replication of a single model across all of their spaces, as well as customers that require maximum flexibility in their space setup and still wish to share content.

Figure 3:
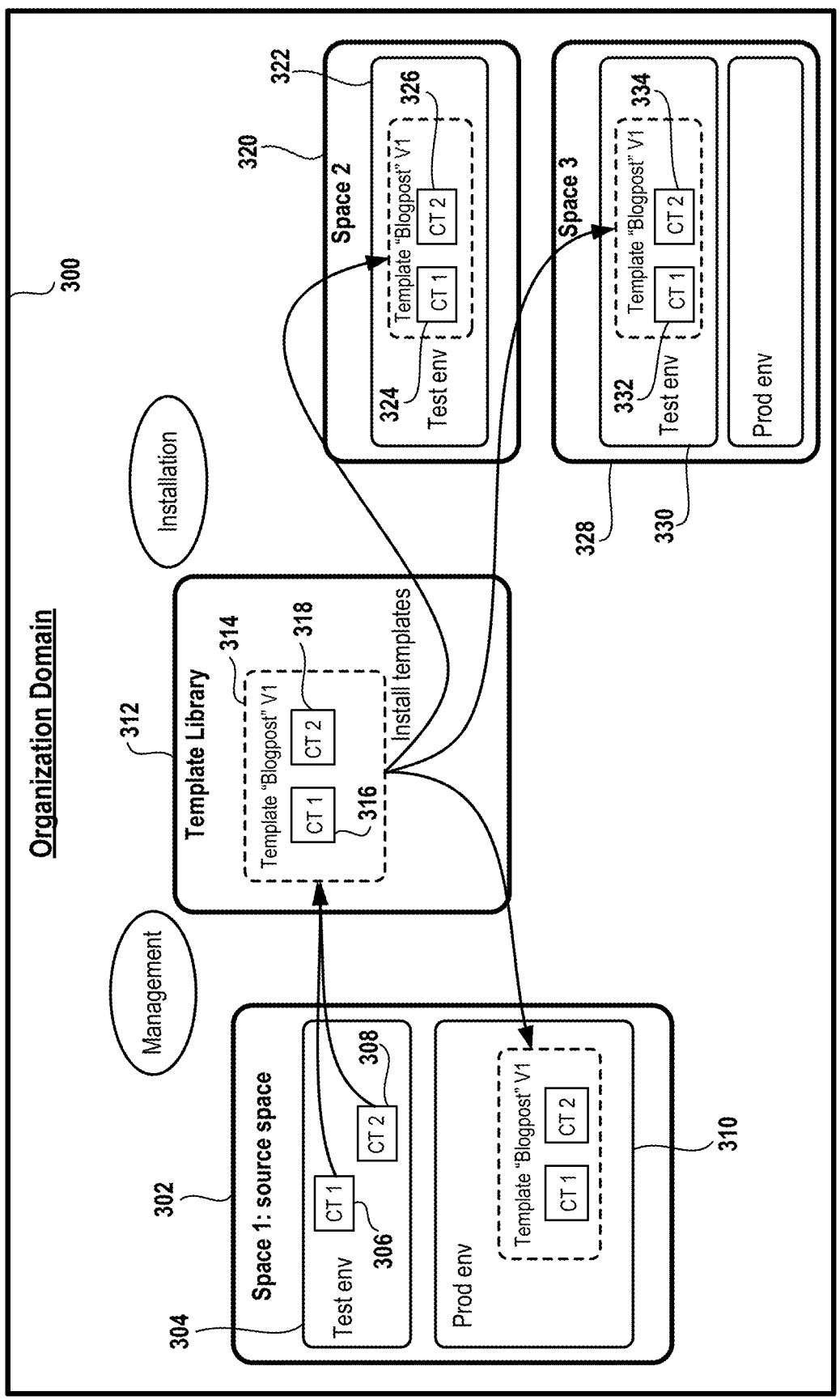
FIG. 3 conceptually illustrates creation and application of a template to enable duplication and synchronization of a content model across multiple environments, in accordance with implementations of the disclosure.

FIG. 3 conceptually illustrates creation and application of a template to enable duplication and synchronization of a content model across multiple space environments, in accordance with implementations of the disclosure.

An organization domain 300 is the allocated hosting resource of the CMS for a given organization that is a customer or subscriber of the CMS. By way of example without limitation, the organization domain 300 may correspond to, or be identified by, a directory or resource locator that is assigned to the organization within the CMS. In some implementations, the organization domain corresponds to, or is identified by, or accessed through, a top-level directory or resource locator assigned to the organization.

The concept of a template for installation into content spaces of a CMS is introduced herein. Broadly speaking a template provides a reusable blueprint of settings information that can be installed into a content space. In various implementations, templates can define the content types, apps, roles/permissions, webhooks, editor user interface or configuration settings, by way of example without limitation. In still further implementations, templates can also contain other configuration types or settings that govern how users interact with the destination content space/environment. This can include content entry and the governance of that content by itself as well as how it interacts with integrated systems. In some implementations, a template can be created from a source space, and then propagated to other spaces within the organization domain.

In the illustrated implementation, a content space 302 is configured as a source space for generating a template. That is, a content model or content types defined within the content space 302 are used to generate a template that will function as a blueprint for defining the content model or content types of other spaces. More specifically as shown, the space 302 includes an environment 304 in which content types 306 and 308 are defined. In the illustrated implementation, the content type 306 is copied into a template 314 and stored as the content type 316; and the content type 308 is also copied into the template 314 and is stored as the content type 318. The template 314 is stored in template library 312, which may contain other templates in accordance with implementations of the disclosure.

It will be appreciated that once the content types 316 and 318 are stored as part of the template 314, in some implementations, the content types 316 and 318 are no longer reliant or connected to the original content types 306 and 308 of the source content space 302. That is, the content types 306 and 308 could be deleted from the source space 302, and the content types 316 and 318 would remain as part of the template 314. In some implementations, a template content type stored to a template can include a "based on" property that indicates the source content type from which the template content type was derived/copied. This provides a loose coupling between the template and source, which does not automatically synchronize the template content type to its source content type, but enables display in the template editor, e.g. when editing the template content type, if the source content type has changed.

Once the template 314 has been created, it is available to be installed into content spaces of the organization domain 300. For example, in the illustrated implementation, the template 314 is installed into an environment 322 of a content space 320 that is also in the organization domain 300. By installing the template 314, then the content types 316 and 318 defined by the template 314 are created in the content space 320, conceptually shown in the illustrated implementation as content types 324 and 326, respectively. The content types 324 and 326 are linked to the template 314 in the system, and managed via the template 314. As discussed in further detail below, templates can be versioned, and so the management of aspects controlled by the template, such as a collection of content types as presently described, may be governed through installation of successive versions of the template.

A template can be installed into multiple content spaces. For example, in the illustrated implementation, the template 314 is also installed into an environment 330 of a content space 328. This creates the content types 332 and 334 in the environment 330 of content space 328, and the content types 332 and 334 are defined from the content types 316 and 318, respectively, of the template 314. The content types 332 and 334 are linked to the template 314, and managed via the template 314.

In some implementations, the template 314 can be installed into another environment of the source content space 302. For example, the environment 304 of the content space 302 may be a test/development environment in which the content types are developed and later deployed into the template 314. Whereas, another environment 310 may be a production environment of the content space 302. As shown, the template 314 may be installed into the production environment 310.

Figure 4:
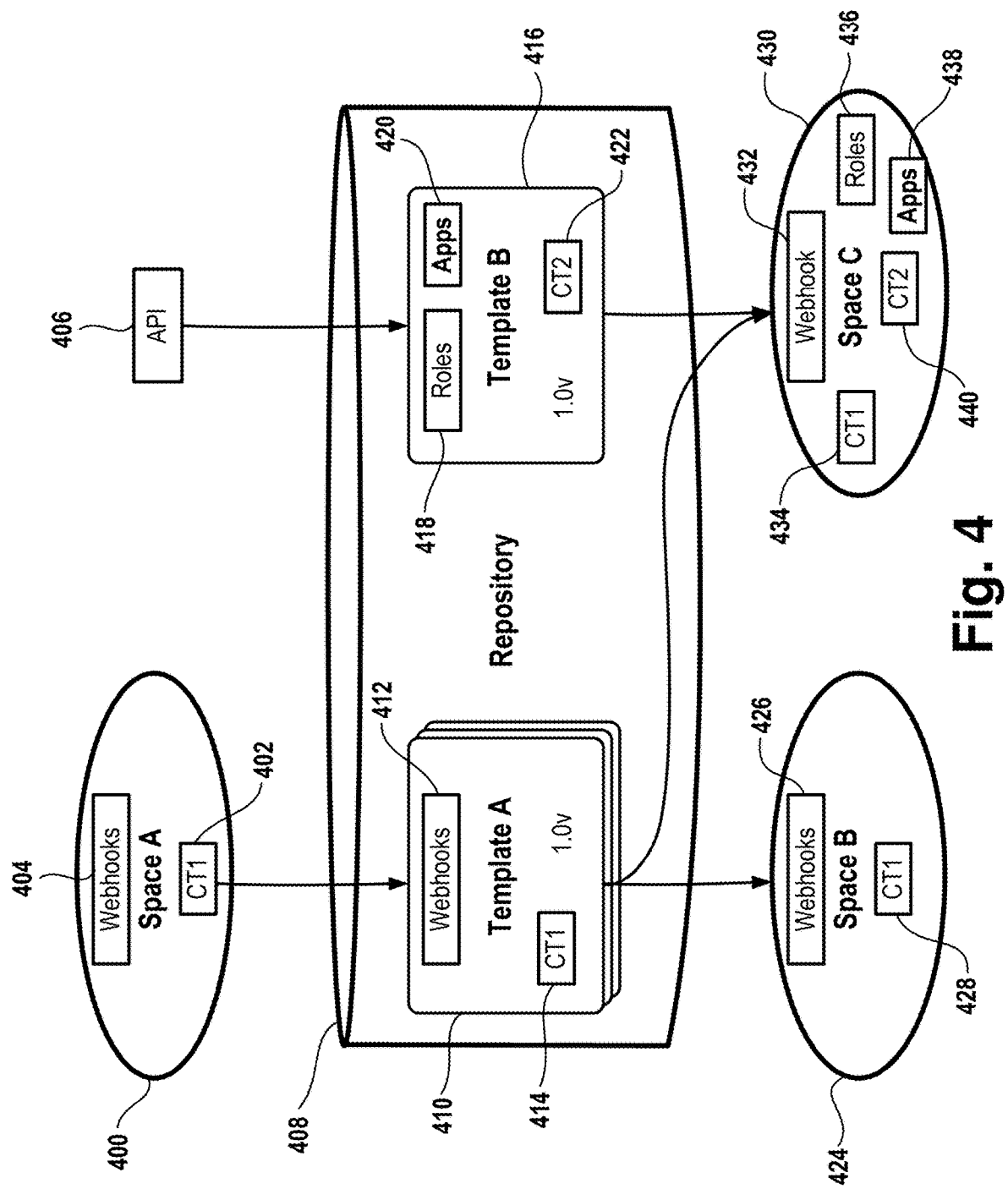
FIG. 4 conceptually illustrates use of templates in a CMS to control and synchronize various aspects of content spaces, in accordance with implementations of the disclosure.

FIG. 4 conceptually illustrates use of templates in a CMS to control and synchronize various aspects of content spaces, in accordance with implementations of the disclosure. As discussed, a template can be created from a source content space, and in the illustrated implementation of FIG. 4, a template 410 is generated from a source content space 400. The content space 400 includes a content type 402 and also includes webhooks 404. These aspects of the source content space 400 can be added/copied to the template 410, so that the template 410 now includes the content type 414 and the webhooks 412 which are defined in accordance with those of the source content space 400. It will be appreciated that a user may selectively determine which content types or webhooks from the source content space 400 will be added to the template 410. The template 410 is stored to a template library/repository 408, that is at the same organization domain level as the content spaces, as discussed above.

A template can also be created directly via a template management API 406. The template management API 406 is exposed by the CMS, and configured to enable template-related functions to be performed via calls to the API 406, such as creation, editing, and deletion of templates, as well as management of template installation into content spaces or specific environments within content spaces. In some implementations, the template management API 406 is part of the aforementioned content management API 104.

In the illustrated implementation, a template 416 is created using the API 406. The template 416 includes a content type 422, as well as roles/permissions 418, and apps 420. It will be appreciated that the roles/permissions 418 defines user roles and their permitted activities for a destination content space, and the apps 420 defines one or more apps for installation into a destination content space.

In the illustrated implementation, the template 410 is installed into a content space 424. As a result, the content space 424 now includes the webhooks 426 defined by the webhooks 412 of template 410, and also includes the content type 428 defined by content type 414 of template 410.

It will be appreciated that more than one template can be installed into a given content space. Thus, with continued reference to the implementation of FIG. 4, the template 410 and the template 416 are both installed into content space 430. As a result, the content space 430 includes webhooks 432 and content type 434 from template 410, and also includes roles/permissions 436, apps 438, and content type 440 from template 416. The webhooks 432 and content type 434 are linked to template 410 and designated as being managed via template 410, whereas roles/permissions 436, apps 438, and content type 440 are linked to template 416 and designated as being managed via template 416.

Figure 5A:
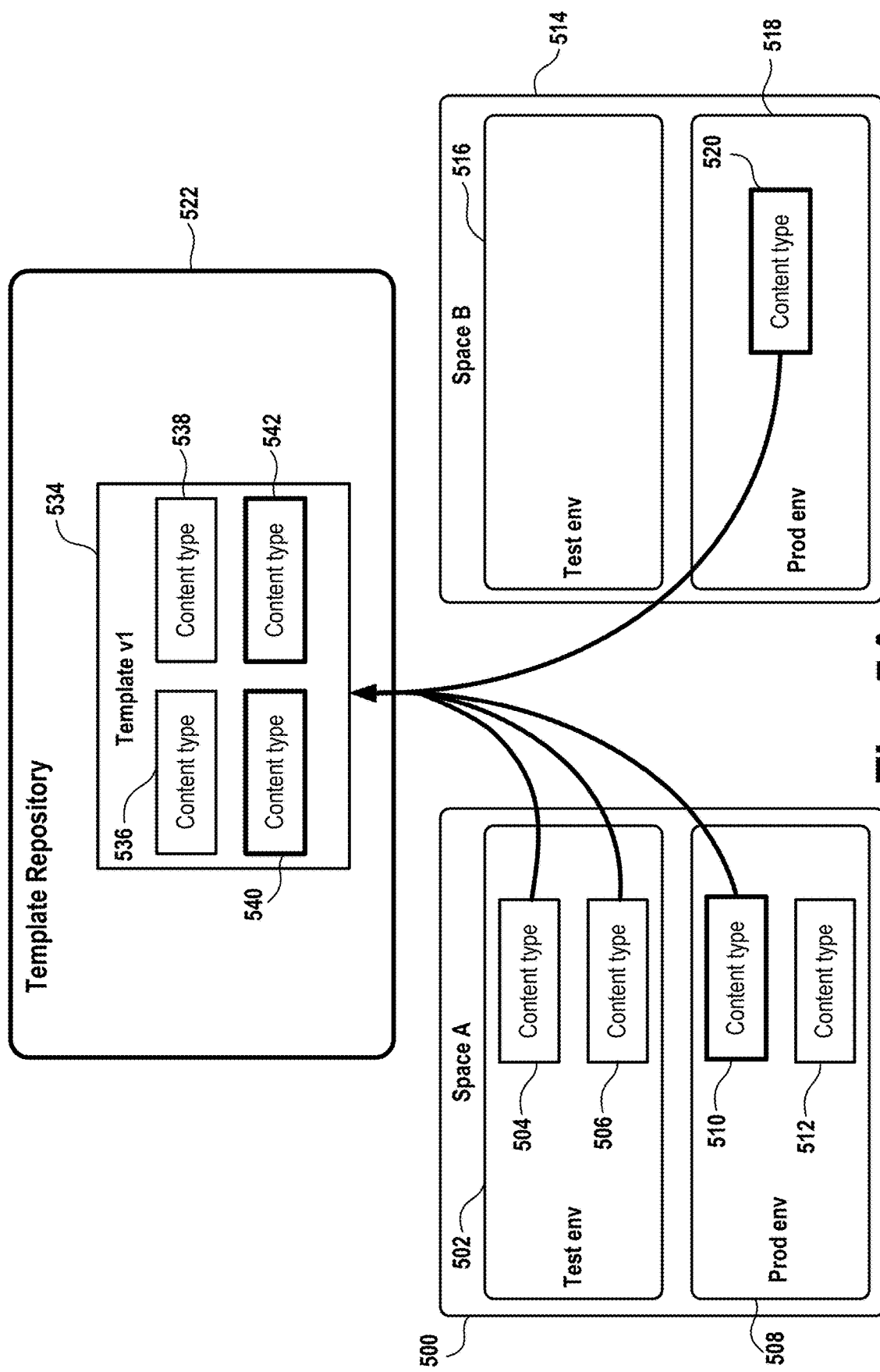
FIG. 5A conceptually illustrates creation of a first version of a template from multiple content spaces, in accordance with implementations of the disclosure.

FIG. 5A conceptually illustrates creation of a first version of a template from multiple content spaces, in accordance with implementations of the disclosure. A first content space 500 includes various environments 502 and 508. The environment 502 of content space 500 includes content types 504 and 506. The environment 508 of content space 500 includes content types 510 and 512. A second content space 514 is also shown in the illustrated implementation, including an environment 516 and an environment 518. The environment 518 of the content space 514 includes a content type 520.

In the illustrated implementation, a template is created that includes content types from various ones of the content spaces, and more specifically from different environments within the content spaces. Initially, a first version of the template 534 is set up in the template repository/library 522. Content types 504, 506, 510, and 520 are selected and added or copied into the first version of the template 534 as content types 536, 538, 540, and 542, respectively. Thus, the template 534 includes the content types 536, 538, 540, and 542 which have been generated from the content types 504, 506, 510, and 520, respectively.

In some implementations, when one or more content types are selected for addition to a template, a check is performed to prevent duplication of content types. For example, a check can be performed to ensure that a selected content type does not match the name of any existing content type in the template.

It will be noted that the content types added to the template have been drawn from content models of various environments and various content spaces. This provides great flexibility in developing and testing content types across different environments and content spaces, while then being able to gather a specific collection of content types in a template so that they can be easily replicated into other environments and spaces without having to individually access the different environments or contents spaces in order to obtain the various content types in the collection.

Figure 5B:
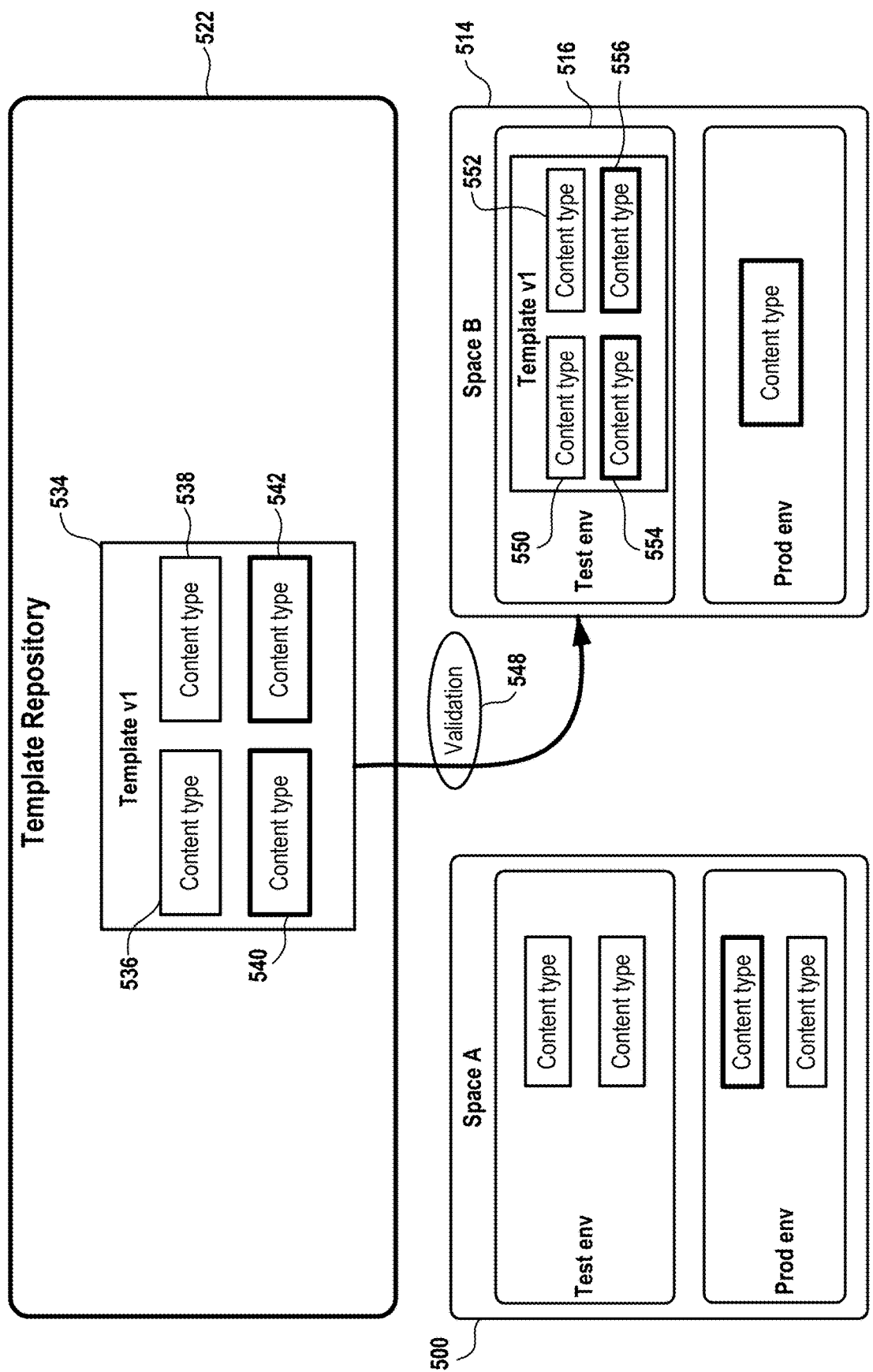
FIG. 5B conceptually illustrates installation of a template into a content space, in accordance with the implementation of FIG. 5A.

FIG. 5B conceptually illustrates installation of a template into a content space, in accordance with the implementation of FIG. 5A. The first version of the template 534 is selected for installation and the environment 516 of content space 514 is selected as the target for the installation. When the first version of the template 534 is installed into the environment 516 of the content space 514, the content types 536, 538, 540, and 542 are added into the environment 516 of the content space 514 as content types 550, 552, 554, and 556, respectively. The content types which are installed using the template 534 are linked to the template in the system, so that these content types can be identified as being managed via the template 534.

In some implementations, during the installation process a validation process 548 is performed to prevent incompatibilities between the template and any existing features of the target environment or content space. For example, the validation process may determine whether any existing content types (that are not already linked to, or managed through, the template) have the same name as any of the content types of the template 534. If any incompatibilities are found during the validation process, then the user can be notified and provided with options to address the incompatibilities. For example, if the aforementioned incompatibility of existing content types with the same name is encountered, then the user can be provided with a link to edit the content model of the target environment/space and possibly remove or change the name of those content types.

In related implementations, for an existing content type in the target space environment having the same name as that of a template content type, options to enable the template to take over management of the content type can be provided. For example, if it is determined that the template content type is compatible with the existing content type (e.g. has at least the same fields with compatible field types), then an option can be provided to the user to allow the content type to be managed by the template. In other implementations, the template can automatically take over the management of the existing content type when such conditions are encountered.

Other examples of incompatibilities that are checked by the validation process include the following: determining whether a limit on the number of content types allowed in a given environment or content space will be exceeded by the installation of the template; determining whether installation of the template would cause removal of a content type field that has not been omitted for deletion or change of a field type which is prohibited to prevent data loss in the target environment/space. Again, responsive to detection of such incompatibilities during the validation process, then links can be provided to the user to address the incompatibilities, such as by editing the content types or content entries of the target environment/space.

Figure 5C:
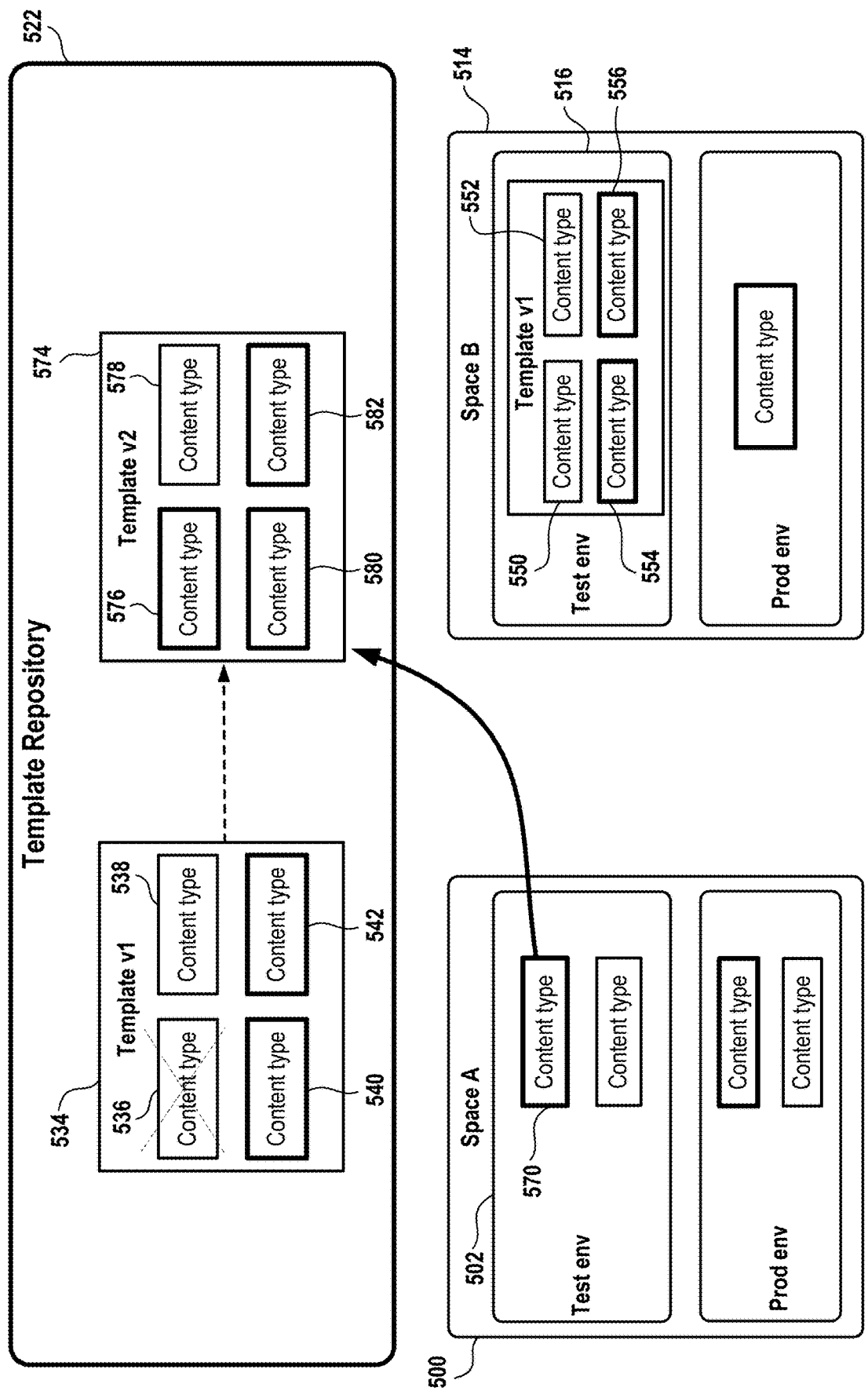
FIG. 5C conceptually illustrates creation of a new version of a template, in accordance with the implementation of FIGS. 5A and 5B.

FIG. 5C conceptually illustrates creation of a new version of a template, in accordance with the implementation of FIG. 5A and 5B. As shown, the first version of the template 534 is selected to update, and a second version of the template 574 is generated. It will be appreciated that template versions are non-destructively editable, so that prior versions are maintained in the template repository 522 and available for installation. In some implementations, every change or group of changes to a template creates a new version. It is possible for different content spaces and environments to have different versions of the template installed. For example, a production environment may be on an earlier version, while a test environment is updated to a newer version for undergoing testing and development.

With continued reference to FIG. 5C, for purposes of illustrating examples of edits to a template, in the illustrated implementation, the template 534 is edited by deleting the content type 536 and also adding a new content type. More specifically, a content type 570 from the environment 502 of the content space 500 is selected and added to the second version of the template 574, as content type 576. Prior to addition of the new content type to the template, a check is performed to ensure that the new content type is compatible with the template. If compatible, then the new content type is added. Following completion of editorial changes, the template is then saved as the second version of the template 574, having content types 576, 578, 580 and 582 which correspond to the content types 570, 538, 540, and 542, respectively. The second version of the template 574 is immediately available for installation/deployment. As the updated template is saved as a new version of the template, the earlier first version is maintained in the template repository 522 and continues to be available for use.

In some implementations, when a new version of a template is installed over a previous version, then the changes/differences between the new version and the previous version are determined, and these changes are applied to the destination content space/environment, and the relevant entities governed by the template, such as content types, are linked to the new version of the template. Thus, with continued reference to the implementation of FIG. 5C, in response to a request to install the published second version of the template 574 into the environment 516 of the content space 514, then the validation process would check for incompatibilities between the template 574 and the existing features of the environment 516. Changes implemented by the second version versus the first version of the template are determined and such changes are checked for potential issues or incompatibility as applied to the target space/environment. For example, if there are content entries defined from the content type 550 and installation of the second version of the template 574 would cause deletion of the content type 550, then this would cause the installation to fail. Upon successful validation then the published second version of the template 574 is installed by executing the changes as defined by the second version of the template 574 versus the previously installed first version of the template.

Figure 6A:
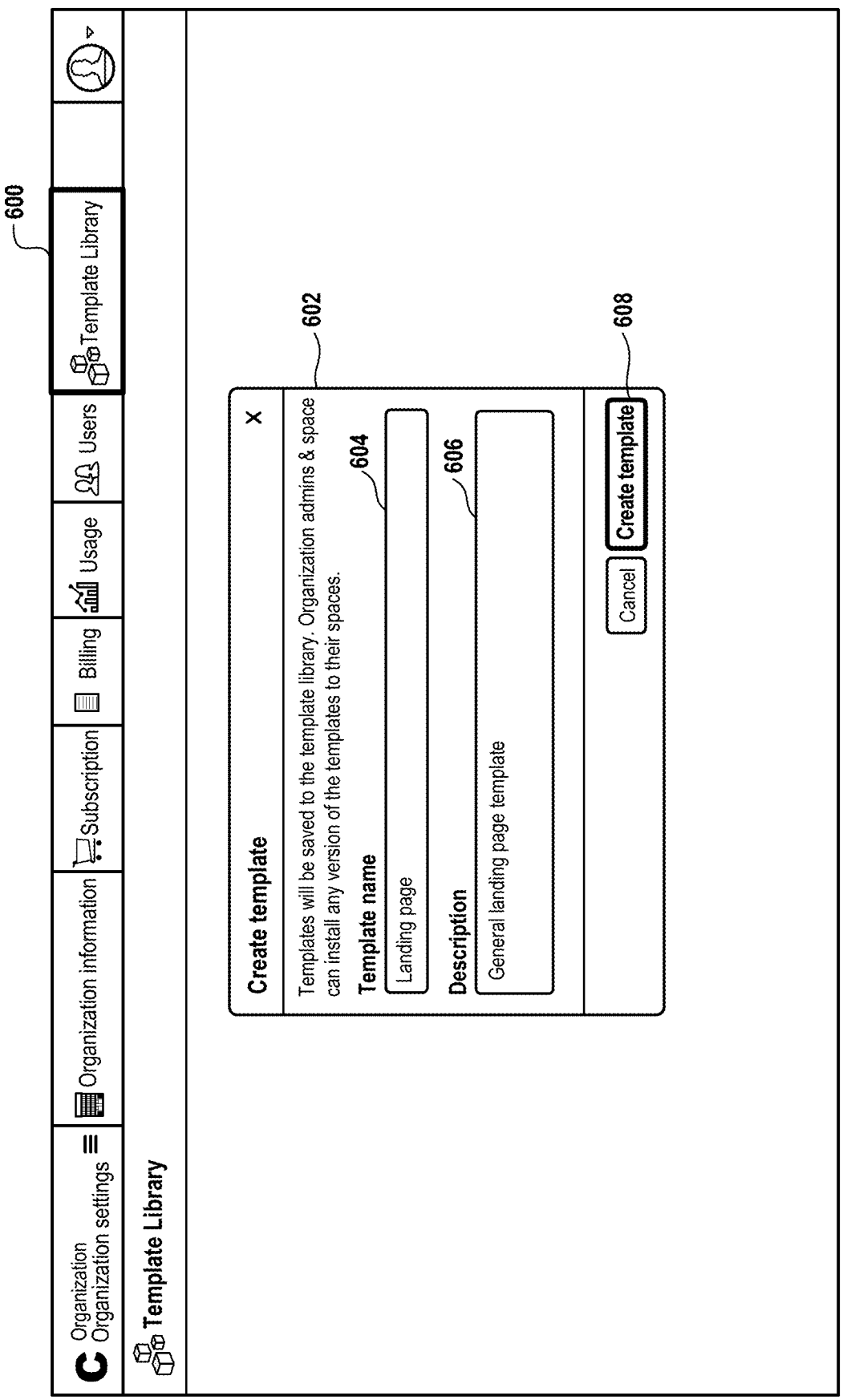
FIG. 6A illustrates an example interface for creating a template, in accordance with implementations of the disclosure.

FIG. 6A illustrates an example interface for creating a template, in accordance with implementations of the disclosure. In the illustrated implementation, a view of an interface for accessing the CMS is shown, and more specifically a Template Library tab 600 has been selected to access a template library of an organization's domain in the CMS. By way of example without limitation, the illustrated view can be provided through the web editor of the CMS or another application capable of accessing the CMS.

As shown, a dialog box 602 has been called up to initiate the template creation process. In the dialog box 602 are a template name field 604 for entering a name for the template (in the illustrated implementation, "Landing page"), and a description field 606 for entering a description of the template. A button 608 is selectable to create the template.

Figure 6B:
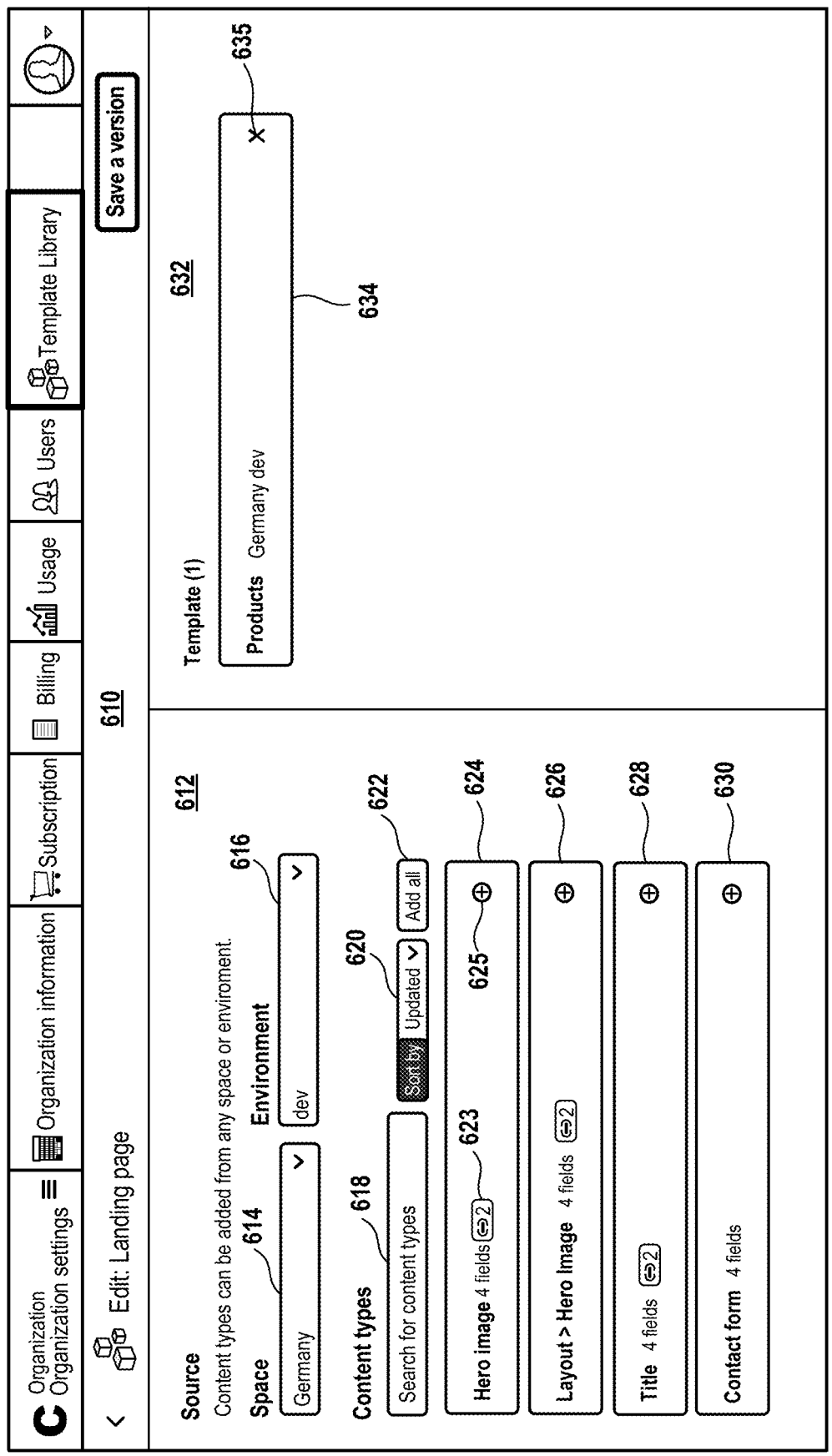
FIG. 6B illustrates a template editing interface for editing a template in the CMS, in accordance with the implementation of FIG. 6A.

FIG. 6B illustrates a template editing interface for editing a template in the CMS, in accordance with the implementation of FIG. 6A. In the illustrated implementation, an editing view 610 is shown for the previously created "Landing page" template. In the editing view 610, a source section 612 enables selection of items for the template, and a template section 632 displays those items that have been added to the template. In the source section 612, a content space selector 614 is configured as a drop-down menu enabling selection of a content space to be a source content space for the template, and an environment selector 616 is configured as a drop-down menu enabling selection of an environment within the selected content space.

In the illustrated implementation, the content space "Germany" has been selected as the source space, and the environment "dev" has been selected as the environment. Accordingly the content types from the "dev" environment of the content space "Germany" are shown below, including the content types 624, 626, 628, and 630. It will be appreciated that while content types are specifically shown in the illustrated implementation, other types of items which can be added to the template may also be shown, such as apps, roles/permissions, webhooks, etc. With continued reference to the illustrated implementation, the content type 624 (a "Hero Image" content type) can be added to the template, for example, by selecting an add button 625 in the interface. To facilitate ease in finding desired content types, a search field 618 is provided to enable searching for content types, and a sort selector 620 is configured to enable sorting by a specified criteria, such as by date last updated. An "Add all" button 622 is selectable to simply add all available content types to the template.

Content types which have been added to the template are moved to the template section 632 of the interface. For example, as shown in the illustrated implementation, a "Products" content type 635 has already been added to the template "Landing page." The "Products" content type 635 can be removed from the template by, for example, selecting a removal button 635, which would move the "Products" content type 634 back to the source section 612 under the listing of available content types.

It is further noted that a reference icon 623 indicates that the "Hero image" content type 624 includes references to other content types (as well as the number of such references).

Figure 6C:
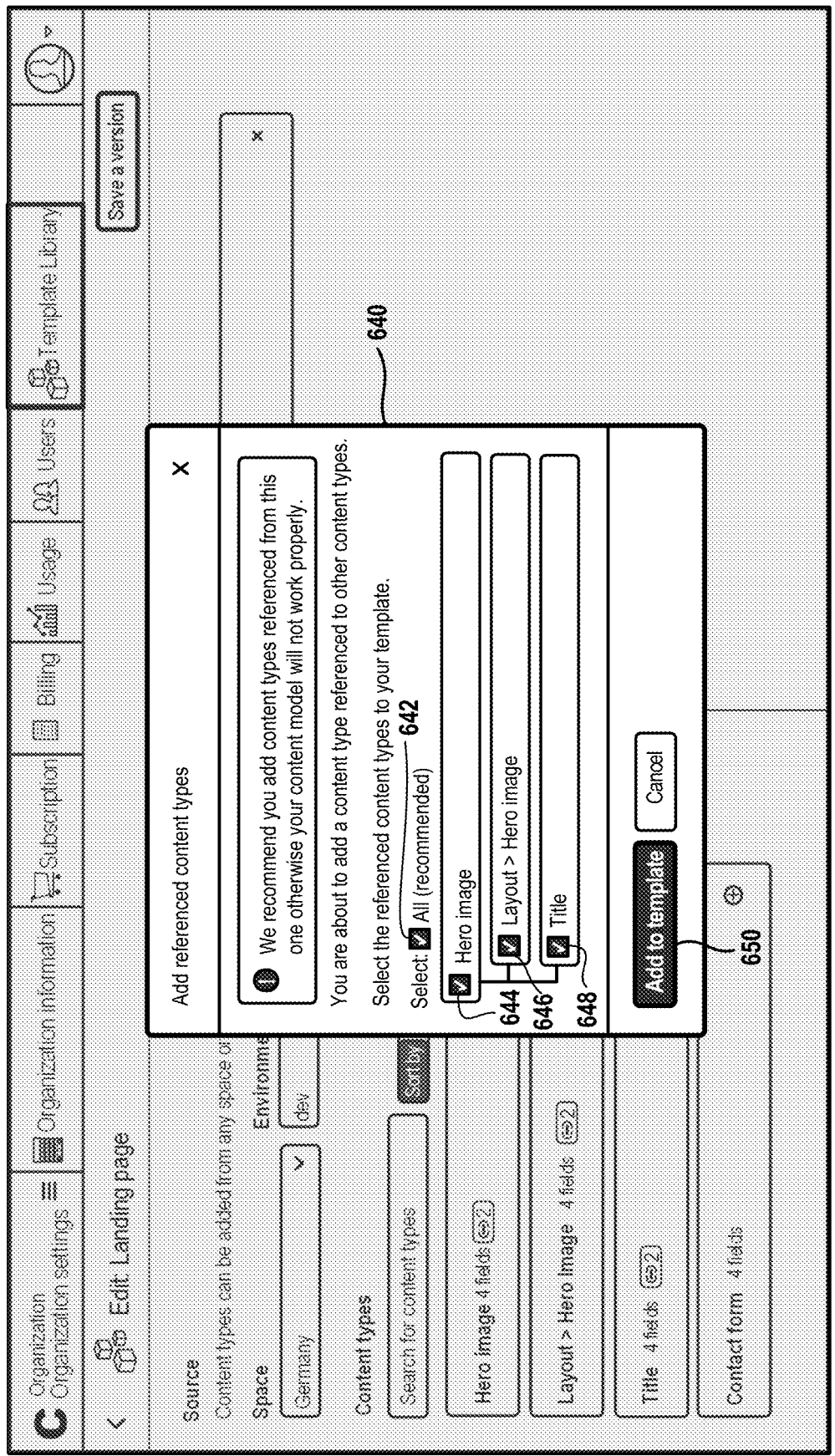
FIG. 6C illustrates an interface dialog box displayed when adding a content type to a template which includes additional references to other content types, in accordance with the implementation of FIG. 6B.

FIG. 6C illustrates an interface dialog box displayed when adding a content type to a template which includes additional references to other content types, in accordance with the implementation of FIG. 6B. In the illustrated implementation of FIG. 6C, a dialog box 640 is shown, which is displayed in response to selection of the add button 625 to add the "Hero image" content type 624 to the template (shown at FIG. 6B). Because the "Hero image" content type 624 references other content types, the dialog box 640 is surfaced to inform the user of this fact and enable the user to select the referenced content types for addition to the template along with the originally selected content type 624.

As shown in the dialog box 640, the system recommends to the user to add content types referenced by the "Hero image" content type. A checkbox 642 is selectable to select all referenced content types along with the "Hero image" content type for addition to the template. In the alternative, checkbox 644 is selectable for the "Hero image" content type specifically, and checkboxes 646 and 648 are selectable for two content types "Layout>Hero image" and "Title", respectively, that are referenced by the "Hero image" content type. As shown, the referenced content types "Layout>Hero image" and "Title" are shown in a hierarchical tree under the "Hero image" content type.

An add button 650 in the dialog box 640 is selectable to add the selected content types to the template.

Figure 6D:
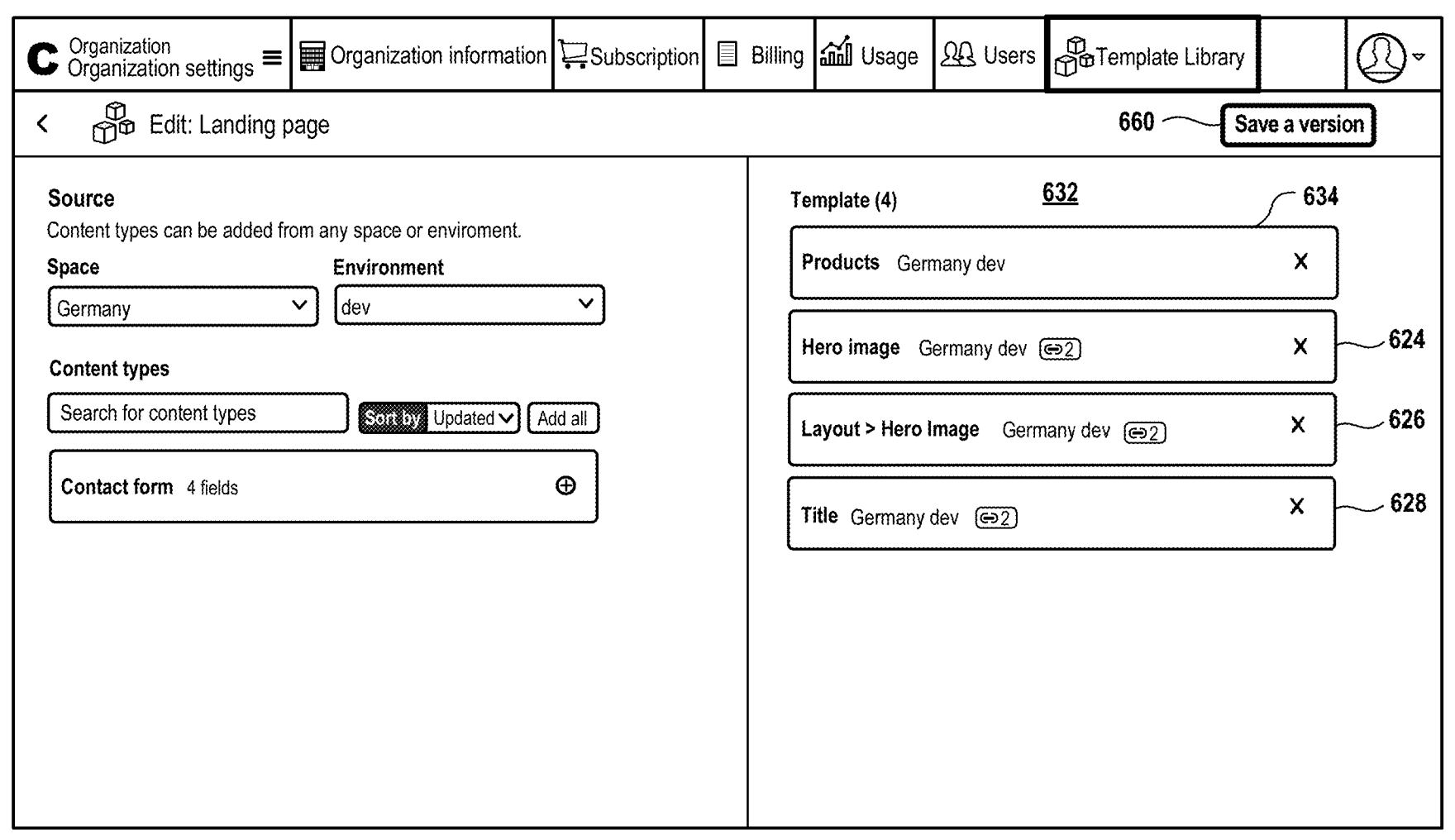

FIG. 6D illustrates the template editing interface following addition of content types to the template, in accordance with the implementation of FIG. 6C. That is, following selection of the "Hero image" content type and its associated referenced content types via the dialog box shown at FIG. 6C, then in FIG. 6D, the result is that the "Hero image" content type 624, along with the "Layout>Hero image" and "Title" content types 626 and 628, have been moved to the listing of content types in the template section 632.

A save version button 660 is selectable to save a version of the template. It will be appreciated that the first time a template is created, then the first version of the template is saved. However, if subsequent edits of a saved version of the template are made, then a new version of the template is created, preserving the prior saved version of the template. Thus, the version history of the template is maintained, and different versions of the template are made available for installation.

Figure 7A:
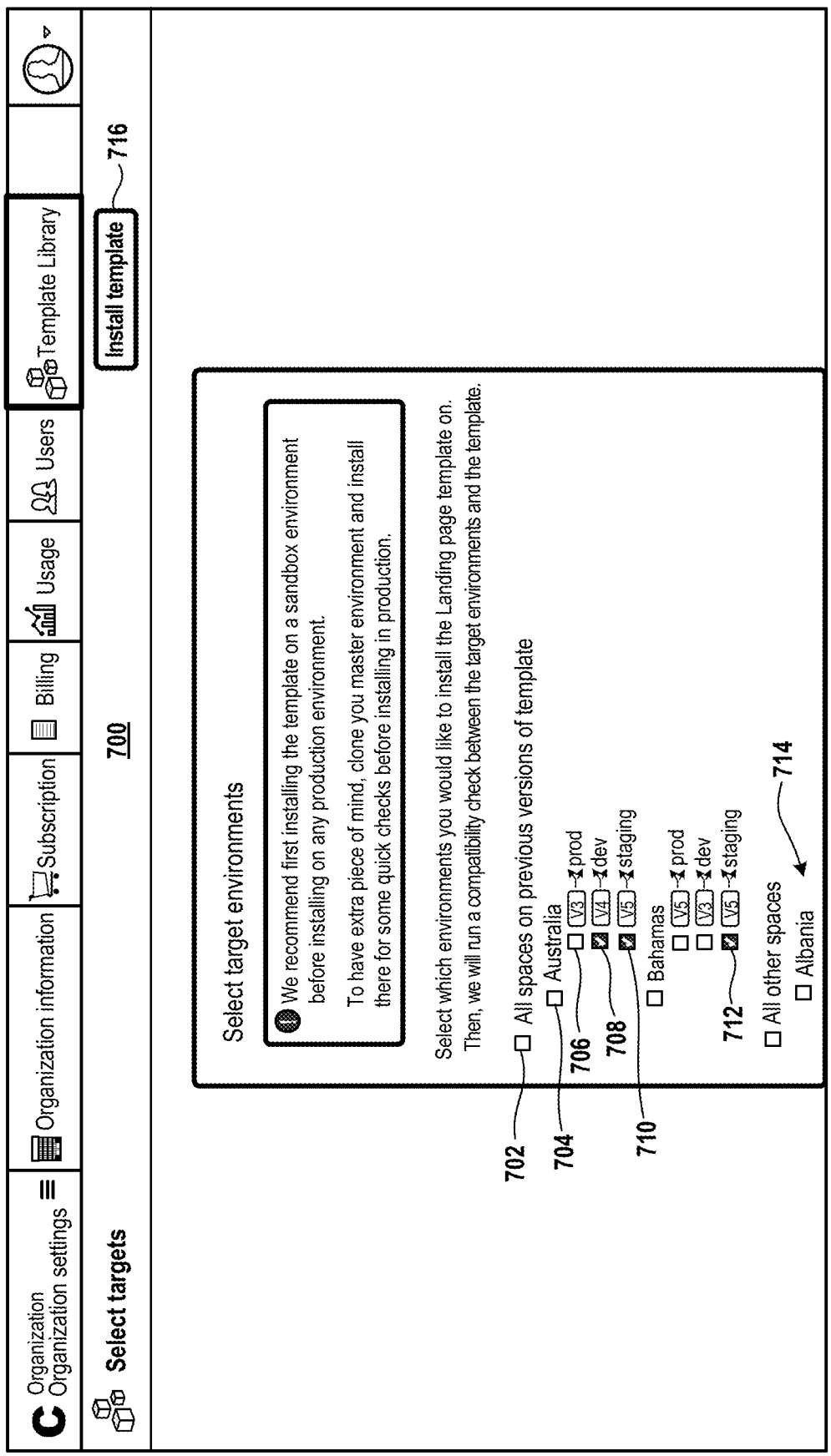
FIG. 7A illustrates an interface for installing a template into a target content space and environment, in accordance with implementations of the disclosure.

FIG. 7A illustrates an interface for installing a template into a target content space and environment, in accordance with implementations of the disclosure. In particular, a target selection view 700 is shown, which enables selection of content spaces and environments for the installation of the template. A listing of available content spaces and their environments is provided in a hierarchical structure. For example, in the illustrated implementation, content spaces that have a previous version of the template include an "Australia" content space, which has "prod", "dev" and "staging" environments, and a "Bahamas" content space having "prod", "dev", and "staging" environments.

A checkbox 702 is selectable to select all content spaces and environments that are on a previous version of the template. A checkbox 704 is selectable to select the "Australia" content space and its environments. Whereas checkboxes 706, 708, and 710 are selectable to enable individual selection of the "prod", "dev", and "staging" environments of the "Australia" space. In the illustrated implementation, a checkbox 712 is also selected, indicating selection of the "staging" environment of the "Bahamas" content space.

A section 714 of the interface shows other content spaces that do not have an earlier version of the template installed. These can be selected in a similar manner to that described above.

An install template button 716 is selectable to initiate installation of the template into the selected environments of the content spaces.

When the command to install a template is received, then a validation process is performed to ensure that there are no incompatibilities or other issues requiring resolution before the template can be installed in any of the target environments/content spaces. If there are no incompatibilities, then the installation is carried out to completion. However, if incompatibilities are found during the validation process, then in some implementations, the installation process is not carried out, and a report of any incompatibilities is displayed to the user.

Figure 7B:
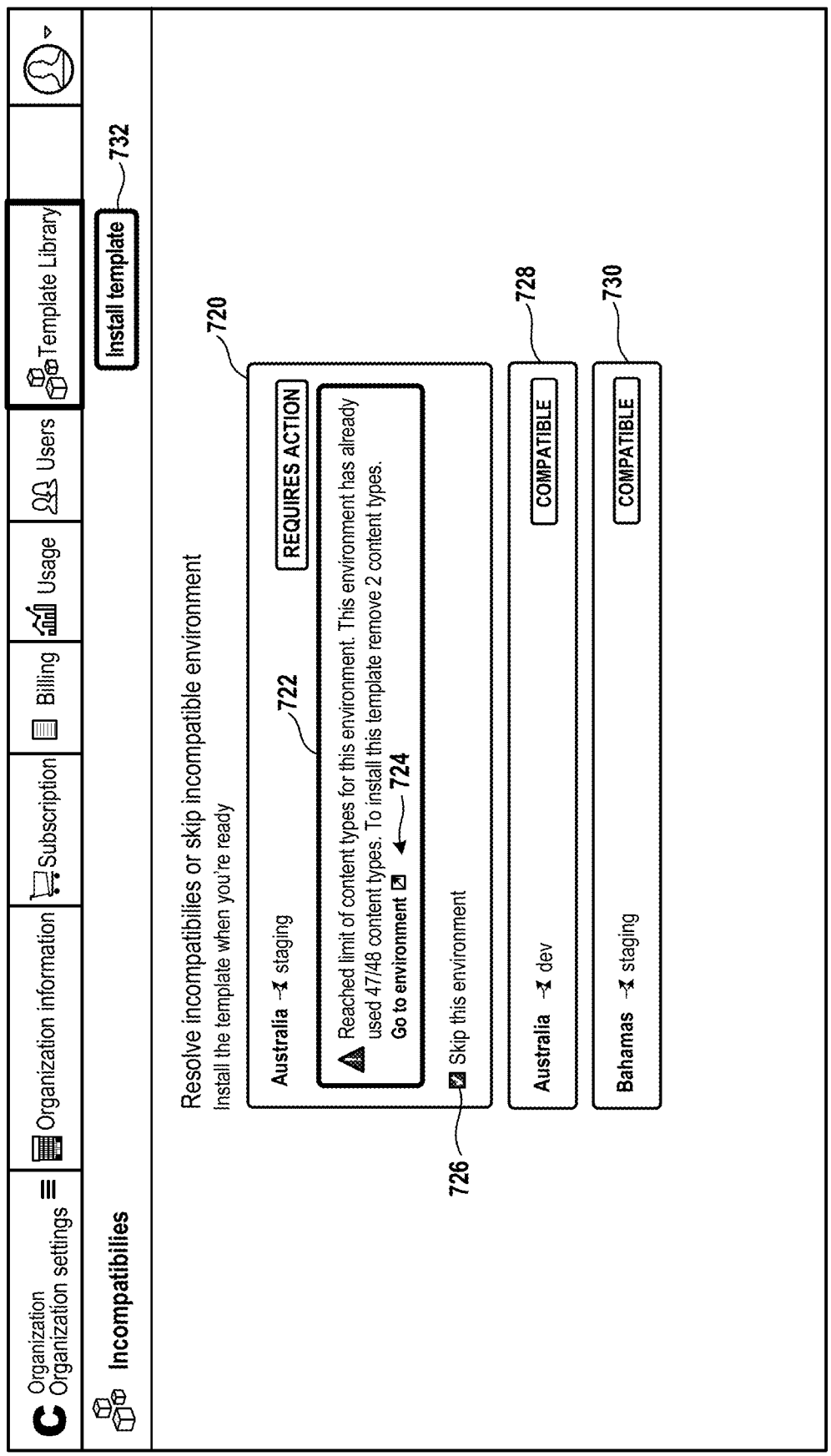
FIG. 7B illustrates an incompatibilities interface view resulting from an attempted installation of the template in which incompatibilities were found during validation, in accordance with the implementation of FIG. 7A.

FIG. 7B illustrates an incompatibilities interface view resulting from an attempted installation of the template in which incompatibilities were found during validation, in accordance with the implementation of FIG. 7A. The target installation environments and content spaces are listed along with information about compatibility with the template. In the block 720 for the "staging" environment of the "Australia" content space, a message 722 is displayed indicating that an incompatibility was found, and more specifically, the limit of content types for the environment has been reached (and installation of the template would cause the number of content types to exceed the limit). A link 724 is provided to an editing interface for the environment/content space, to enable the user to directly access the environment at issue and resolve the incompatibility. For example, the link 724 may be configured to redirect the user to a content model editing interface to edit the content model of the environment. A checkbox 726 can be selected to simply skip installation of the template into the "staging" environment of the "Australia" content space.

Additional blocks 728 and 730 indicate that the respective environments and content spaces are compatible with the template, so that installation would be successful in these environments.

The install template button 732 is selectable to again attempt installation of the template, while in the illustrated implementation, skipping the "staging" environment of the "Australia" content space.

FIG. 8A illustrates an interface for accessing a content model, in accordance with implementations of the disclosure. In the illustrated implementation, a content model tab 800 is selected within the web editor interface of the CMS. Accordingly, a listing 801 of content types in the content model is shown. As noted, when a template is installed that governs one or more content types, then such content types are linked to the template and managed via the template. For example, when a new version of the template is installed then the installed content types may be changed in accordance with the new template version.

To provide clarity to users of the system, an indicator can be provided to alert the user to the fact that a content type is managed through a template. In the illustrated implementation, for example, the content type 802, which is a "Component: Hero" content type, is listed with an accompanying graphical icon 804 that provides such an indication. A text indicator 806 may also be provided to inform the user that the content type 802 is managed through a template, and may be surfaced, for example, when hovering a mouse pointer over the icon 804.

FIG. 8B illustrates an interface for editing a content type in the CMS, in accordance with the implementation of FIG. 8A. In the illustrated implementation, the aforementioned "Component: Hero" content type 802 has been selected for editing, and thus the interface shown at FIG. 8B provides access to the fields and other attributes of the content type 802. A graphical icon 810 is provided in association with the name of the content type, as well as a text indicator 812, both of which serve to inform the user that the content type is managed through a template.

The following description of a CMS will provide additional context and systems for implementing the embodiments of the present disclosure. Traditional content management systems, e.g., like WordpressTM were designed to store and present content elements like text, images and video on websites. That is, the traditional CMS approach is to manage content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPressTM, DrupalTM, and other apps. In other embodiments, the CMA may be integrated with other backend systems, such as an e-commerce shop.

The content preview API is a variant of the CDA for previewing your content before delivering for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 9:
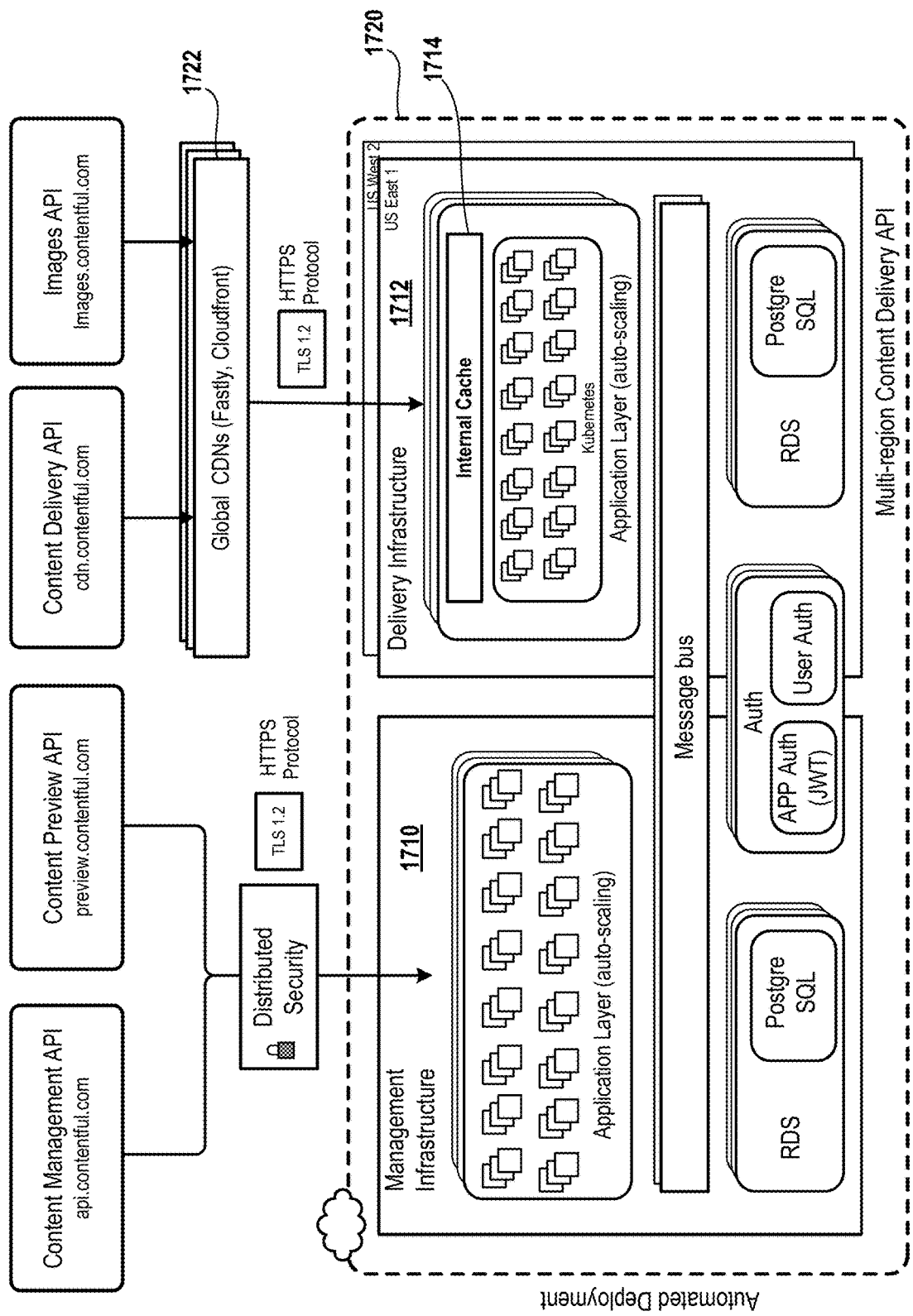
FIG. 9 illustrates an example of how a content management API (CMA) and a content preview API (CPA) can make calls to a content management system (CMS), in accordance with implementations of the disclosure.

FIG. 9 illustrates an example of how the content management API (CMA) and the content preview API (CPA) can make calls to the content management system (CMS) 1720. In one configuration, the CMS 1720 includes compute and storage resources for management of structured content. As described above, a web editor provides a user interface (UI) that remote client device uses to access the CMS 1720. Based on the type of content creation and/or editing being performed via the UI of the web editor, either the CMA or CPA are used to make API calls to the management 1710 compute and storage resources. The compute and storage resources which run the CMS 1720, in one embodiment, are run in a cloud based environment. The cloud based environment, for example, may be provided by a cloud compute and storage servicing entity, e.g., such as Amazon Web Services (AWS)TM, GoogleTM Cloud, MicrosoftTM AzureTM, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third party hosting services. In some configurations, the hardware configurations may include virtualized hardware and expandable storage to meet the processing needs of the CMS 1720. Broadly speaking, the CMS 1720 is executed using cloud infrastructure, which includes the use of multiple interconnected data centers throughout the world.

In one configuration, the CMS 1720 also includes a delivery component 1712, which is configured to service processing operations from the content delivery API and the images API. As shown, in one embodiment, the delivery component 1712 is provisioned with internal cache 1714, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1712 is part of the CMS 1720, and is also executed on compute and storage of a cloud infrastructure. In one embodiment, structured content is prepared and/or edited using the management component 1710, before it is published for external consumption. By separating structured content in the cloud infrastructure, it is possible to prevent non-ready content to be accessed and delivered using the CDA.

Agents accessing the CMS 1720, including organizations, individual users, as well as APPs, are authenticated by an authentication and authorization system. In some implementations, user authentication uses MySQL. In some implementations, APP authentication uses JSON Web Tokens.

It should be apparent that the present embodiments may be practiced without some or all of these specific details. Modification to the modules, code and communication interfaces are also possible, so long as the defined functionality for the content management system (CMS) or modules of the CMS is maintained. In other instances, well-known process operations have not been described in detail in order not to unnecessarily obscure the present embodiments. In some implementations, any of the above-described systems of the present disclosure, in part or in whole, can constitute means for performing or implementing any of the embodiments of the present disclosure. In some embodiments, the means for language, e.g., for configuring or exposing is embodied in tangible media, wherein the tangible media is configured to store executable program code segments to enable the use of the means. In some embodiments, the means for language can be understood to be related to actual code segments that can work either as standalone code when executed or in communication or in conjunction with code executed by or for functionality of the CMS.

One or more embodiments can also be fabricated as computer readable code on a non-transitory computer readable storage medium. The non-transitory computer-readable storage medium is any non-transitory data storage device that can store data, which can thereafter be read by a computer system. Examples of the non-transitory computer readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer-readable storage medium can include a computer-readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. In a content management system (CMS), a computer-implemented method for managing content types across multiple content spaces in the CMS, comprising:
   receiving, through a template creation interface, a selection of a plurality of content types of a source content space in the CMS, wherein the plurality of content types do not store content of the source content space;
   generating a template having said selection of said plurality of content types, and storing said template to a template library;
   receiving a command to install the template into a destination content space in the CMS;
   responsive to said command, installing the plurality of content types of the template into the destination content space, and establishing a link between the destination content space and the template such that the installed content types are identified as being managed via the template, wherein installing the content types of the template includes performing a validation process to verify compatibility of the template with the destination content space;
   providing an editor interface of the CMS that enables access to edit content of the destination content space;
   receiving, through the editor interface of the CMS, a command to create a content entry based on one of the installed content types; and
   responsive to the command to create the content entry, then generating and storing the content entry in the destination content space in the CMS, said content entry having one or more fields as defined by the one of the installed content types, wherein the installed content types do not store the content of the destination content space, and wherein said content entry is configured to store the content of the destination content space for delivery to a presentation context when retrieved from the CMS.

2. The computer-implemented method of claim 1, wherein the editor interface is configured to display the installed content types, and wherein said display includes a visual indicator that identifies the installed content types as being managed via the template.

3. The computer-implemented method of claim 2, wherein the method further includes:
   further receiving through the editor interface of the CMS, input data for storage into the one or more fields of the content entry.

4. The computer-implemented method of claim 1, wherein verifying compatibility includes verifying that no existing content types of the destination content space have the same name as any of the content types of the template.

5. The computer-implemented method of claim 1, wherein verifying compatibility includes verifying that installing the content types of the template into the destination content space would not exceed a number of content types allowed in the destination content space.

6. The computer-implemented method of claim 1, wherein the method further includes:
receiving a command to install a second template into the destination content space;
responsive to said command to install the second template, installing content types of the second template into the destination content space, and establishing a link between the destination content space and the second template such that the installed content types of the second template are identified as being managed via the second template.

7. The computer-implemented method of claim 1, wherein the method further includes:
receiving a command to install the template into a second destination content space;
responsive to said command, installing the content types of the template into the second destination content space, and establishing a link between the second destination content space and the template such that the installed content types of the second destination content space are identified as being managed via the template.

8. The computer-implemented method of claim 1, wherein the source content space, the template library, and the destination content space are part of a common domain defined for a customer of the CMS.

9. The computer-implemented method of claim 1, wherein the installed content types enable content entries to be defined from the content types within the destination content space, the content entries being configured to have fields for entry of content data, said fields being defined in accordance with the content types from which said content entries are defined.

10. The computer-implemented method of claim 1, wherein the template further defines one or more of webhooks, roles, or apps; and,
further responsive to the command to install the template into the destination content space, then installing the webhooks, roles, or apps of the template into the destination content space.

11. In a content management system (CMS), a computer-implemented method for managing content types across multiple content spaces in the CMS, comprising:
receiving, through a template creation interface, a selection of a plurality of content types of a source content space in the CMS, wherein the plurality of content types do not store content of the source content space;
generating a template having said selection of said plurality of content types, and storing said template to a template library;
receiving a command to install the template into a destination content space in the CMS;
responsive to said command, performing a validation process to verify compatibility of the template with the destination content space;
responsive to successful verification of the compatibility of the template with the destination content space, then installing the plurality of content types of the template into the destination content space, and establishing a link between the destination content space and the template such that the installed content types are identified as being managed via the template;
providing an editor interface of the CMS that enables access to edit content of the destination content space;
receiving, through the editor interface of the CMS, a command to create a content entry based on one of the installed content types; and
responsive to the command to create the content entry, then generating and storing the content entry in the destination content space in the CMS, said content entry having one or more fields as defined by the one of the installed content types, wherein the installed content types do not store the content of the destination content space, and wherein said content entry is configured to store the content of the destination content space for delivery to a presentation context when retrieved from the CMS.

12. The computer-implemented method of claim 11, wherein verifying compatibility includes verifying that no existing content types of the destination content space have the same name as any of the content types of the template.

13. The computer-implemented method of claim 11, wherein verifying compatibility includes verifying that installing the content types of the template into the destination content space would not exceed a number of content types allowed in the destination content space.

14. The computer-implemented method of claim 11, wherein the installed content types enable content entries to be defined from the content types within the destination content space, the content entries being configured to have fields for entry of content data, said fields being defined in accordance with the content types from which said content entries are defined.

15. The computer-implemented method of claim 14, wherein verifying compatibility includes verifying that installation of the template would not delete an existing content type for which there are existing content entries of the existing content type in the destination content space.

* * * * *